Jan. 1, 1952 H. J. FINDLEY ET AL 2,581,010
WINDSHIELD WIPER APPARATUS
Filed Aug. 2, 1949 3 Sheets-Sheet 1

INVENTORS
HOWARD J. FINDLEY
WALTER ROSS EAMES JR.
BY
ATTORNEYS

Jan. 1, 1952     H. J. FINDLEY ET AL     2,581,010
WINDSHIELD WIPER APPARATUS
Filed Aug. 2, 1949     3 Sheets-Sheet 3

INVENTORS
HOWARD J. FINDLEY
WALTER ROSS EAMES JR.
BY
ATTORNEYS

Patented Jan. 1, 1952

2,581,010

UNITED STATES PATENT OFFICE 2,581,010

WINDSHIELD WIPER APPARATUS

Howard J. Findley, Chardon, Ohio, and Walter Ross Eames, Jr., Hazel Park, Mich., assignors to Eaton Manufacturing Company, Cleveland, Ohio, a corporation of Ohio Application August 2, 1949, Serial No. 108,194

14 Claims. (Cl. 60—52)

This invention relates to windshield wiper apparatus and more particularly to substantially constant speed operating windshield wipers.

Broadly, the invention comprehends the provision of a windshield wiper mechanism powered by hydraulic fluid and controlled for operation by either vacuum or electricity so as to provide a windshield wiping operation of adequate power and constant speed.

An object of the invention is the provision of a windshield wiper mechanism of simple construction which will have adequate power, operate at substantially constant speed and cost no more than presently comparable wiper mechanism for accomplishing equal results.

Another object of the invention is the provision of a hydraulic powered windshield wiper mechanism having sufficient capacity to fulfill all operating requirements.

Another object of the invention is the provision of a hydraulic pump powered windshield wiper and independent power means for controlling the pump discharge for the proper operation thereof.

A further object of the invention is the provision of a windshield wiper mechanism for engine driven vehicles operated by hydraulic pump means driven from the engine of the vehicle and wherein the hydraulic pump discharge is controlled by other powered means associated with the engine, said pump means and other powered means being so linked together for operation as to insure the proper phase operation of the windshield wiper.

A yet further object of the invention is the provision of a hydraulic pressure operated windshield wiper mechanism controlled for proper operation by either a vacuum or electrical actuated valve effective to trigger the fluid delivered by the hydraulic pressure means and wherein the windshield wiper actuates at the predetermined opposite ends of its stroke a valve controlling the vacuum or electrical current supply to the valve for the proper phase operation of the pump supplying pressure fluid for actuating the windshield wiper.

A still further object of the invention is the provision of a hydraulic pump operated windshield wiper mechanism controlled for operation by vacuum or electrically actuated valving, including means incorporated therewith for controlling the speed phase of operation, the constant regulation at any particular speed phase, and the automatic parking of the wiper out of the normal operating range thereof.

Other objects and advantages of the invention will appear from the following description taken in connection with the drawings, forming a part of the specification, and in which.

This invention is directed at the provision of a windshield wiper mechanism of sufficient capacity to permit of the effective wiping of curved windshields and the like, of vehicles, imposing heavier blade loading than normal flat windshields, at a substantially constant speed.

The windshield wiper mechanism as herein devised is adapted to be hydraulic operated and either vacuum or electrically controlled wherein the hydraulic power will be derived from a hydraulic pump driven from a power output member of an engine of the vehicle to which the mechanism is applied and the vacuum as obtained from the engine or the electricity from some electrical source such as the vehicle storage battery. Whereas the hydraulic pump need be constructed to develop sufficient operating pressure for windshield wiper operating purposes, the vacuum or electrical means are only required to actuate a valve for controlling the pressure operation of the pump.

This windshield wiper mechanism as specifically designed comprises a hydraulic pump driven from an engine generator or any other suitable power take off from the engine, a hydraulic cylinder having a piston reciprocable thereon actuated by the hydraulic fluid power in one direction and reversely operable by spring means opposing the fluid pressure, an automatically actuated valve controlling the pump for intermittent pressure operation thereof, and means actuated by the movement of the piston for controlling the power means for actuation of the pump valve so as to effect a proper cycling operation of a wiper blade driven from off the piston. The automatic valving in one preferred form is actuated by engine vacuum, said vacuum supply therefor in turn being controlled by the movement of the hydraulic operated piston at predetermined ends of its stroke so as to properly phase control the pumping cycle effective to move the windshield wiper driven from the piston in a constant pattern at substantially constant speed back and forth across a vehicle windshield. A modified form of actuating the automatic valving utilizes an electrical solenoid arranged in an electrical circuit similarly controlled as in the vacuum control by the movement of the hydraulically operated piston. The automatic valving for the proper pump development of pressure fluid acts to either permit of a pressure operation delivery of the pump to the hydraulic cylinder or a by-passing between the discharge and intake sides of the pump such that during this phase of operation the spring pressure acting on the piston is sufficient to move the piston and discharge the fluid from the cylinder back to the pump reservoir whereby a forward and reverse suction operation of the piston is attained.

In addition to the cycling control of the windshield wiper mechanism as effected through the automatic valving for controlling the pumping cycle of the pump and the control of vacuum or electrical power by way of the piston movement, manually controlled valve means are provided for regulating the delivery of fluid under pressure to the cylinder and the discharge therefrom on a spring operation of the piston effective to regulate the speed of operation of the wiper mechanism and also for parking the wiper mechanism by shutting off either the vacuum or electrical power for controlling the automatic valving associated with the pump. The hydraulic operated spring opposed piston is so constructed relative to its normal operating movement as to be moveable upon cessation of windshield operation to a position permitting of parking the windshield wiper blades out of their normal range of operation across the windshield and thereby be moved out of the line of normal vision.

Referring to the drawings for more particular details of the invention 10 represents generally an engine driven automotive vehicle having a windshield wiper mechanism 12 driven from an engine generator 14, the generator deriving its driving power from the engine, not shown, by way of belt drive 16, and windshield wiper drive blade mechanism 18, the blades 20 of which are movable in an arcuate back and forth motion across the windshield 22 of the vehicle.

Figures 2, 10:
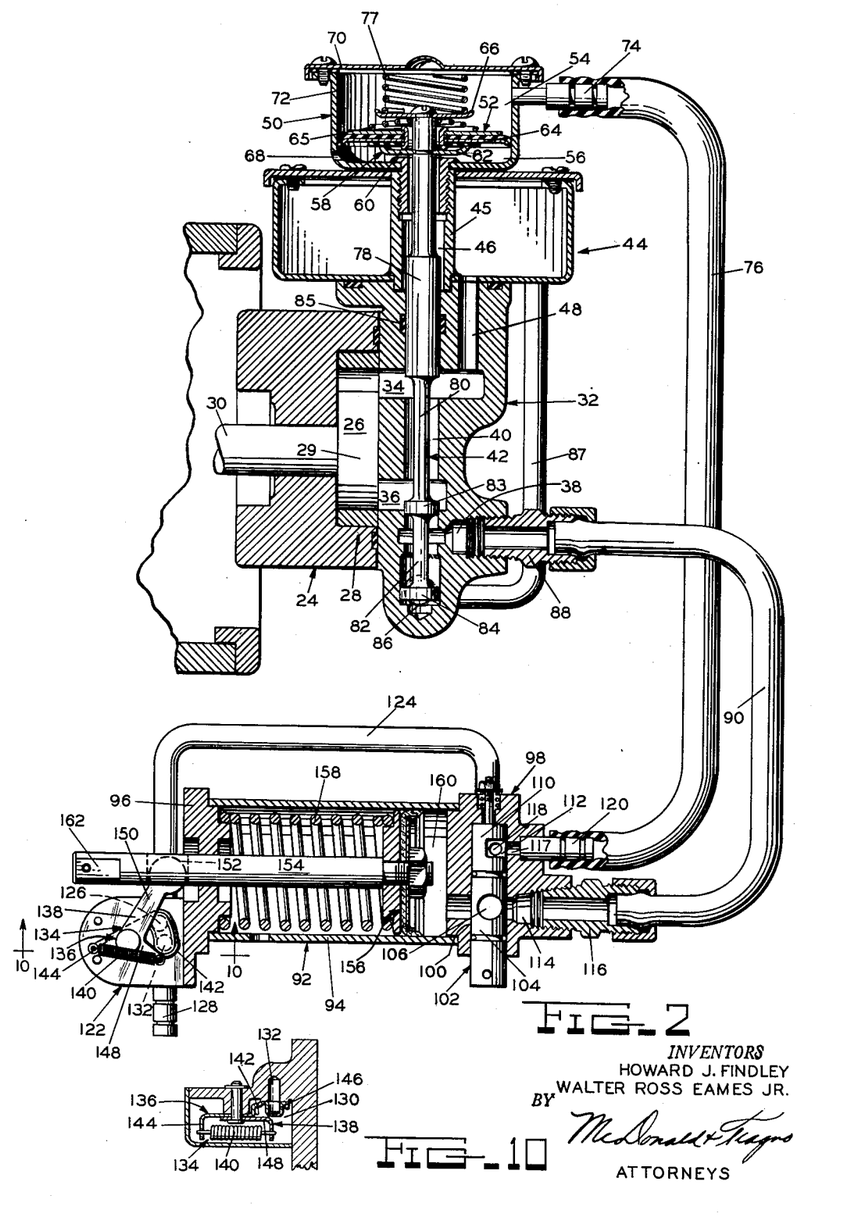
Fig. 2 is a vertical cross-sectional view of a hydraulic operated vacuum controlled windshield wiper mechanism.
Fig. 10 is a view taken along substantially lines 10—10 of Fig. 2.

With reference to Fig. 2 the windshield wiper mechanism comprises a hydraulic pump apparatus 24 constituting a Gerotor type of internal gear pump 26, rotatable in a pump housing 28 having its internal gear 29 driven from a shaft 30 forming the exterior of the shaft of generator 14 upon which the pump housing 28 is mounted. The housing 28 is enclosed by a combination end plate and valve housing 32 mounted fixedly upon housing 28 in any suitable manner, the purpose of which will hereinafter appear.

The valve housing 32 provides therein combination intake and discharge ports and passages 34 and 36 respectively for the pump 26 communicating with the pumping chamber thereof, a fluid passage outlet 38 from the valve body, and a fluid passage 40 extending axially through the valve body providing communication between the passages 34, 36, and 38, having a plunger valve 42 reciprocable therein for controlling communication among the ports. A hydraulic fluid supply tank 44 of annular shape is fixedly suitably secured to valve housing 32 and includes a central sleeve 45 having an opening 46 therethrough concentrically arranged and extending axially with the passage 40 with a portion of valve 42 extending therethrough. The tank 44 provides a reservoir of fluid for pump 26 communicating with the intake 34 thereof by way of passage 48 in housing 32.

The tank 44 has mounted in turn thereon a vacuum cylinder 50 in which is reciprocable a piston 52 mounted for movement with plunger valve 42. The piston 52 divides cylinder 50 into two chambers 54 and 56 respectively constituting the vacuum and atmospheric chambers and incorporated a valve mechanism 58 in the head thereof controlling communication between the chambers 54 and 56. The valve mechanism 58 includes a disc plate 60 fixedly secured on the end extremity of plunger 42 having a turned flange 62 engageable with an annular sealing element 64 secured on the head of piston 52. The flange 62 is normally pressed into sealing engagement with element 64 by a coil spring 65 disposed between the head of the piston opposite from sealing element 64 and a disc 66 secured on plunger 42. The chamber 56 has atmospheric communication through port 68 whereas the chamber 54 is sealed to its vacuum supply by a cover 70 secured in annular sealing relation on body 72 of cylinder 50. The chamber 54 has vacuum communication by way of inlet fixture 74 having vacuum line or conduit 76 connected thereto. A spring 77 disposed between cover 70 and disc 66 opposite from spring 65 normally resists the action of the vacuum to move plunger 42.

The plunger valve 42 in addition to being attached at one end to piston 52 includes a main body or portion 78 of a size comparable to the passage 40 for reciprocation therein, a pair of reduced portions 80 and 82 respectively, a portion 83 of like diameter size to the portion 78, and a portion 84 of larger diameter than portions 78 and 83 arranged at one extremity of plunger 42.

The body portion 78 which is reciprocable in passage 40 extends axially therethrough and is engaged at its outer periphery by an annular seal 85 disposed in valve housing 32 about the portion 78 inhibiting the leakage of fluid from the passages 34 and 40 to the cylinder 50.

The portion 83 of plunger 42 is reciprocable in passage 36 to control communication therefrom for fluid delivery to either the branch of passage 40 communicating with passage 34 or through the branch of passage 40 communicating with passage 38 such that when passage 36 has through communication with either passage 34 or 38 no communication is had with the other of these two passages. Portion 84 of the plunger is reciprocable in a portion of passage 40, of slightly larger diameter than the other portions thereof to accommodate portion 84, and portion 84 of the plunger controls communication between passage 38 and a fluid outlet passage or port 86 appropriately connected to the fluid reservoir by fluid conduit 87. The portions 83 and 84 of the plunger are cooperable with respect to that branch of passage 40 communicating with passages 36, 38 and 86 as to provide for alternate communication of passage 38 with passages 36 and 86 while at the same time inhibiting fluid flow to the other passages.

The outlet passage 38 is connected by an appropriate outlet connection 88 to hydraulic fluid line or conduit 90.

The fluid conduit 90 provides for the conveyance of hydraulic fluid between pump 26 and cylinder 92, said cylinder including a tubular body portion 94, an end plate 96 and a combination end plate and valve housing 98.

The combination end plate and valve housing 98 is provided with a valve bore 100 extending therethrough in which a manually actuated valve 102 is mounted for rotation therein. One portion 104 of the valve has a pair of passages 106 and 108, arranged perpendicularly to one another and to the axis of the valve body, 106 being of much larger size than 108, and another portion 110 has a half moon slot 112 therein extending perpendicular to the axis of the valve body. The portion 104 of the valve having passages 106 and 108 therein controls a passage 114 providing communication between cylinder 92, by way of connection 116 arranged on valve housing 98, with conduit 90 whereas portion 110 of valve 102 having slot 112 therein controls connection between passages 117, 118 and 119 in valve housing 98, passage 117 having communication by way of fixture 120 with conduit 76. The passage 118 communicates with a valve housing 122, forming a part of end plate 96 by way of conduit 124 with passage 126 formed in the valve housing 122 whereas passage 119 is open to the atmosphere. The housing 122 is connected by an appropriate fitting 128 to an engine intake manifold, not shown, and said fitting in turn communicates internally of the valve body with a chamber 130 through passage 132. The passage 126 which also communicates with chamber 130 is controlled for communication with passage 132 by a trigger valve 134 for controlling the vacuum between the vacuum source of supply and the chamber 54 of vacuum cylinder 50 which supply is additionally controlled by portion 110 of valve 100.

The trigger valve 134 includes a pair of lever members 136 and 138 pivotably mounted upon a common axis and connected together by a trip switch action spring 140. The lever member 136 has a pair of oppositely disposed arms 142 and 144, the end of arm 142 of which defines a cup or cover member 146 cooperative with the passages 126 and 132 to control the communication therebetween. The lever member 136 has a pair of angularly disposed arms 148 and 150, the extremity of arm 148 of which is connected to the extremity of arm 144 of lever 136 by spring 140, the purpose of which will hereinafter appear.

The extremity of arm 150 is connected for movement in a slot 152 formed in a piston rod 154 extending axially from the cylinder 92 having a piston 156 secured upon the rod thereof opposite from the end of the rod associated with arm 150. The piston is biased in a direction retracting the rod from extension out of the cylinder by a coil spring 158 arranged between the end plate 96 and piston. A pressure chamber 160 is provided on the side of the piston opposite from spring 158, between the piston and combination end plate and valve housing 98 communicating with passage 114 controlled as by portion 104 of valve 100.

The end extremity 162 of piston rod 154 is connected to windshield wiper drive blade mechanism 18 through an appropriately disposed cable operating system effective upon the stroking operation of piston 156 in cylinder 92 to properly actuate the windshield wiper 18 in a back and forth motion across windshield 22.

The valve 102 is the manually actuated means which serves to control the speed of operation of the windshield wiper mechanism as well as provide for the stopping and starting thereof. For convenience of manipulation by an occupant of a vehicle in which mechanism 12 is installed, the valve is adapted to be connected to a control knob, not shown, located on or near the instrument panel of the vehicle.

The valve 134 which is of the snap action variety is controlled for operation by the position of piston rod 154 for the purpose of controlling the triggering of vacuum from its source of supply. It is to be noted that valve 134 can not change its position of operation and reverse the action of the piston until the wiper arms have completed their stroke in one direction as actuated by piston 156.

The vacuum cylinder is made of a size relative to piston 52 and vacuum supply as to provide for the substantially constant speed operation of the windshield wiper under a vacuum of substantially two or three inches at the manifold whereas the valve 58 in association with the piston provides relief control for the proper operation of the piston in accordance with pressure actuating valve 42 in one direction and vacuum on piston 42 in the opposite direction. Valve 58 permits of the communication of atmospheric chamber 56 with vacuum chamber 54 when the vacuum in chamber 54 exceeds a predetermined desired amount in the actuation of piston 52 and valve 42 connected thereto against the pressure differential of valve pistons 83 and 84.

The spring 158 is designed in relation to the capacity of the pump 26 so as to afford for an operation of the piston under a substantially similar pressure in both directions of operation, that is under pump pressure operation in one direction and spring pressure in the opposite direction and also to provide for the movement of piston 156 beyond its normal operating stroke to afford a parking of the windshield wiper blades outside of the normal range of operation. This is possible since under normal operation the spring 158 does not move piston 156 to the full extent in its spring pressed direction thereby permitting of this function when the valve 102 is moved to a desired parking position of the windshield wiper mechanism.

Figure 1:
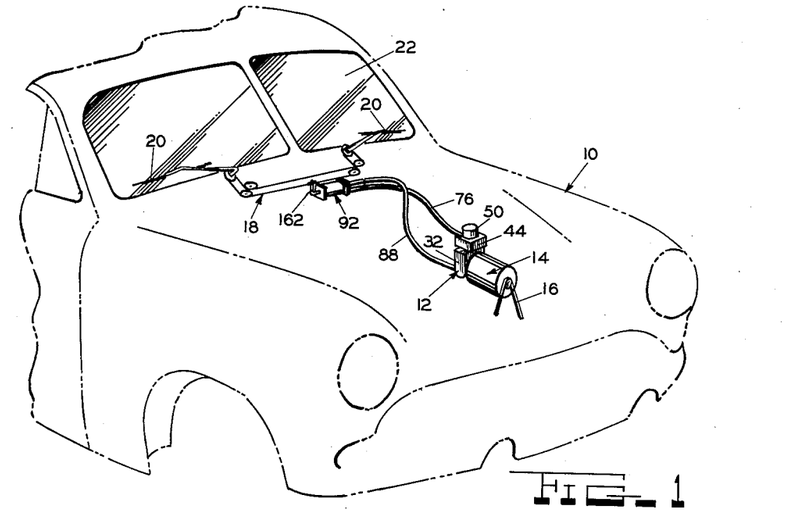
Fig. 1 is an isometric view of a hydraulic operated windshield wiper mechanism as adapted to a motor vehicle.

In a normal operation of the windshield wiper mechanism 10 wherein as shown by Fig. 1 the valve 102 is set for low speed regulation of the windshield wiper mechanism and wherein the piston 156 has advanced to the end of its spring pressure stroke and the vacuum trigger valve 134 has been moved to provide for vacuum communication between passages 128 and 132 through cover 146 providing for the flow of vacuum through conduit 124, passage 118, through slot 112, passage 117, and conduit 76 to vacuum chamber 54 of cylinder 50 to cause an actuation of piston 52.

Fig. 2 illustrates the position of the piston 52 just prior to the actuation thereof by the vacuum supply being delivered to chamber 54 such that valve 42 has not as yet been moved to a position to provide for the delivery of fluid under pressure from the pump to the cylinder 92. Upon the movement of the valve under the influence of vacuum in chamber 54 as induced by movement of piston 52, the valve is moved to a position wherein portion 83 of the valve moves to close off communication of passage 34 with passage 36 by blocking that portion of passage 40 connected therebetween. Simultaneously therewith the passage 36 is open to communication with passage 38 for the delivery of fluid under pressure therethrough and portion 84 of plunger valve 42 closes off passage 86 from communication with passage 36 which existed during the other cycle of operation. With the movement of piston 52 and valve 42 as described, the delivery of fluid is permitted under pressure through port 36, a branch of passage 40, passage 38, conduit 90, and through passage 108 in portion 104 of valve 102 by way of passage 114 into chamber 160 of cylinder 92 for the subsequent pressure movement of piston 156, rod 154, valve 134 and mechanism 18.

Figure 4:
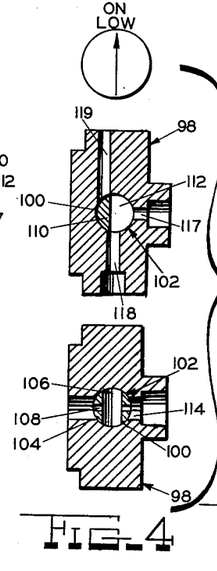

The low speed regulation positions of portions 104 and 110 respectively of valve 102 controlling the above described operation are disclosed by Fig. 4 of the drawings.

As the fluid under pressure as supplied by pump 26 acts upon piston 156 to move it against spring 158, the piston rod 154 operates to actuate mechanism 18 for the movement of wiper blades 20 in arcuate paths towards one another as viewed in Fig. 1, and move lever member 138 thereby causing an over center tensioning of spring 140 such that after the piston rod moves a predetermined distance providing for the proper operational movement of the windshield wiper blades 20 toward one another, the spring causes a snap action operation of lever member 136 to move cover member 146 to a position disrupting communication between passages 126 and 132 and the subsequent flow of vacuum through to the vacuum chamber 54 of cylinder 50. As the vacuum supply to chamber 54 is stopped and no vacuum operates on piston 52, the pressure of the fluid discharged from port 36 operates to move valve 42 quickly in a direction acting to have portion 83 of plunger valve 42 move to the position shown by Fig. 2 providing for the communication of passage 34 with passage 36 by way of that branch of passage 40 connecting the passages 34 and 36 thus effecting a lowered pressure operation of the pump. The discharge pressure is effective at the completion of the normal desired pumping cycle to quickly snap the valve 42 to provide recirculated operation of the pump because of the difference in areas upon which the fluid under pressure operates, of the respective portions 78 and 84 of valve 42.

With the movement of the valve 42 for recirculation operation of the pump the portion 84 is moved to a position uncovering port 86 to provide communication with passage 38 while at the same time portion 83 cuts off port 36 from communication with passage 38 such that the spring 158 is then effective to move piston, piston rod 154, lever member 138, and mechanism 18 in a reverse direction to that of the pump 26. The valve 134 as actuated by lever 138 operates in a reverse direction similarly to the actuation induced by piston rod 154 being moved by the pressure of the hydraulic fluid acting on piston 156, effective to once again restore the valve to the position of Fig. 2.

Figure 5:
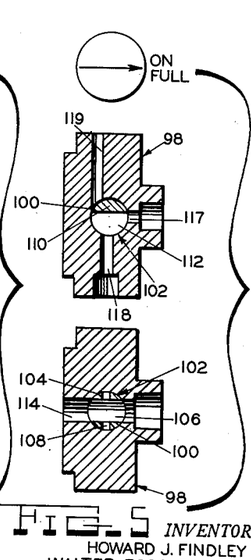

When it is desired to regulate the windshield wiper for a speed operation in excess of that obtained from the positioning of valve 102, as shown in Figs. 2 and 4, the valve 102 can be moved to the position of Fig. 5 providing for the maximum speed operation of the wiper mechanism wherein passage 106 of portion 104 of the valve registers with passage 114 for maximum or modulated flow of fluid under pressure therethrough. In viewing slot 112 of portion 110 of valve 42 in Fig. 5, it is to be noted that a condition of communication between passages 117 and 118 is maintained, as under low speed operating conditions of the windshield wiper mechanism, as disclosed by Fig. 4. The cycle of operation as defined in connection with the low speed operation of the windshield wiper operation remains the same for maximum or intermediate speed ranges of operation.

Figure 3:
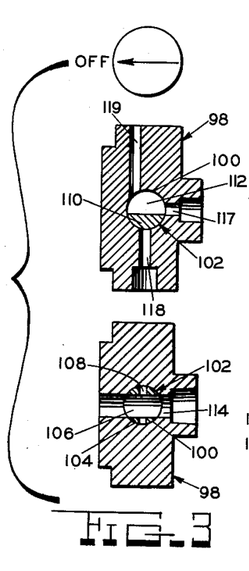
Figs. 3, 4 and 5 are a combination series of end and cross-sectional views of the manually operable valve in different positions of control for controlling the hydraulic and vacuum supply lines of the windshield wiper mechanism shown by Fig. 2.

If it is desired at any time or phase in the operation of the windshield wiper mechanism to cease operation or park same, the valve 102 is moved to off position as shown by Fig. 3 thereby providing communication of the vacuum supplied to passage 117 from the engine manifold with the atmosphere by way of slot 112 in portion 110 of valve 102 with atmosphere connected passage 119. With the cessation of delivery of vacuum as controlled by valve 102 the operation of piston 52 by vacuum is discontinued thereby immediately causing movement of valve 42 to effect recirculation operation of the pump 26. As the pump resorts to recirculation, the spring 158 moves piston 153 thereby dispelling the fluid from chamber 160 of cylinder 92 back through passage 114, valve passage 106, conduit 90, passage 38, passage 40, port 86 and conduit 87 for return to the tank 44 so as to be available to replenish the pump 26 for further pressure delivery operation thereof. As the piston 156 and rod 154 move under the influence of spring 158, and wherein the vacuum supply is connected to the atmosphere by way of passage 119 connected with valve 102, no vacuum control or supply to cylinder 50 can occur for a further operation of valve 42 thus permitting of the movement of piston 156 to the end of cylinder 92 into engagement against the main wall of valve housing 98, thereby moving the blades 20 attached to mechanism 18 as controlled by rod 154 beyond their normal range as during a wiping operation. This serves to park the windshield wiper blades 20 outside of the vehicle occupants' line of vision.

Figs. 6, 7, 8 and 9 are directed to the provision of a hydraulically operated-electrically controlled windshield wiper mechanism 200. The mechanism in more general respects is similar to mechanism 12 especially with regard to the pumping apparatus 24, the valve housing 32, the hydraulic fluid flow controlling valve 42, the piston mechanism 52 and piston 156.

Figures 6, 7, 8, 9:
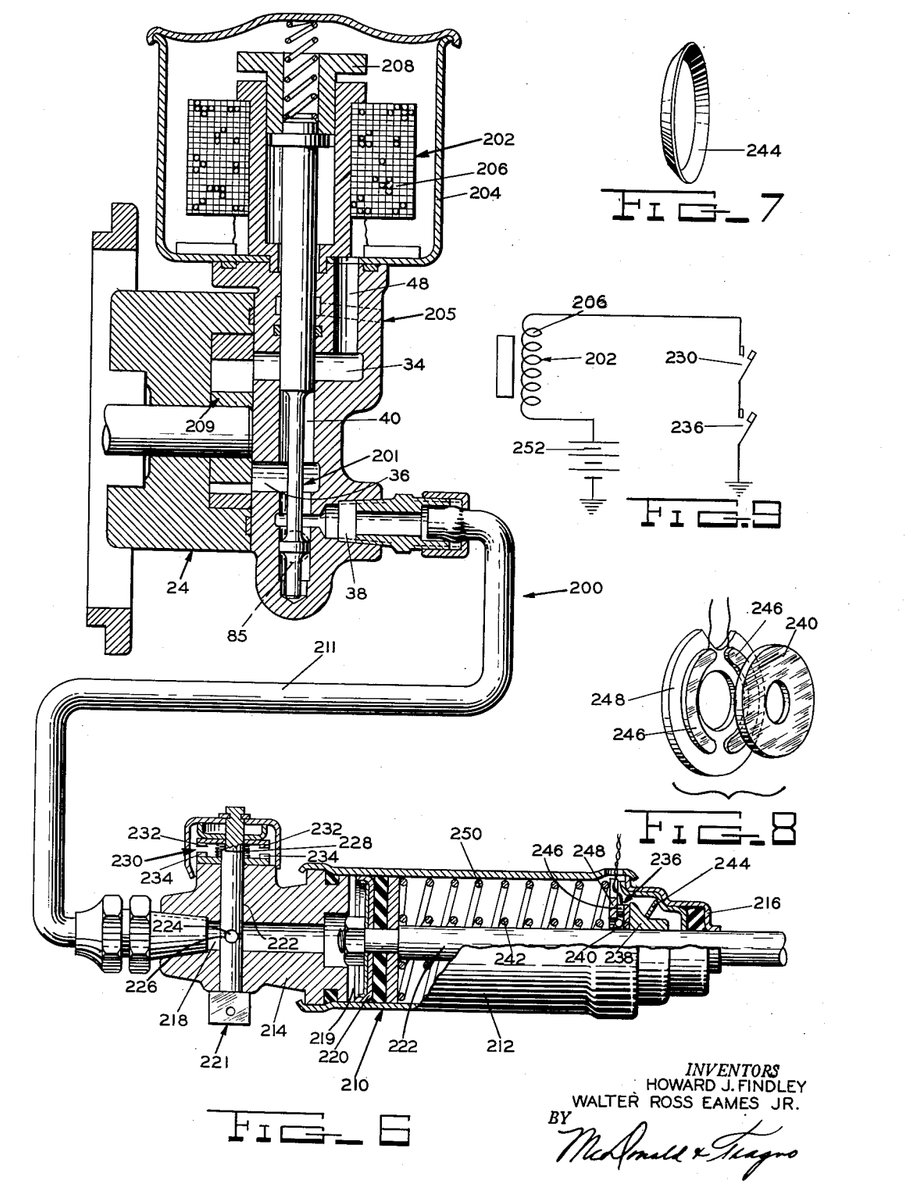
Fig. 6 is a vertical cross-sectional view of a hydraulic operated-electrically controllable windshield wiper mechanism serving as a modification to the structure of Fig. 2.
Fig. 7 is an isometric view of the Belleville type spring incorporated in the hydraulic cylinder structure of Fig. 6.
Fig. 8 is an isometric view of the electrical contact rings controlling the electrical circuit for the solenoid of Fig. 6.
Fig. 9 is a diagrammatic illustration of the electrical circuit controlling the operation of the solenoid actuated valve incorporated in the structure of Fig. 6.

The valve 201 as shown by Fig. 6 is controlled for operation by a solenoid mechanism 202 supported in a hydraulic fluid supply tank 204 arranged on valve housing 205, said solenoid mechanism including an annular coil member 205 and a spring pressed armature 208, reciprocable centrally of the coil 206, and movable upon the energization of coil 206 therein to control the position of valve 201 secured thereto.

The fluid discharged by pump 209 controlled as by valve 201 is fed to a cylinder 210 by conduit 211, said cylinder including a tubular body portion 212, a combination end plate and valve housing 214 and an end closure 216.

The combination end plate and valve housing 214 is provided with a passage 218, therethrough, providing communication between conduit 211, and chamber 219 formed between piston 220 and the housing 214, controlled as by a manually actuated valve 221 rotatable in a bore 222 in the housing 214 connected in perpendicularly arranged manner to passage 218.

The valve 221 has provided in one portion thereof lying in the path of passage 218 a pair of perpendicularly arranged passages 224 and 226 corresponding to passages 106 and 108 of valve 102 of mechanism 12 and serving a like purpose, and provides a cam surface 228 arranged in the circumference near the extremity thereof engageable with electrical switch means 230.

The switch means 230 includes a pair of stationary electrical contacts 232 associated with and adapted to be engaged by a pair of spring pressed contacts 234, movable in relation to supporting means therefor, riding on cam surface 228 providing for the movement toward or away from contact and circuit closing, dependent upon the rotary control of valve 221.

The piston 220 and piston rod 222, as shown by Fig. 6, illustrate the parked position of the windshield wiper blades to be actuated thereby wherein the valve 221 is in parking position with the contacts 234 out of engagement such that the coil 206 is deenergized.

The cylinder 210 has arranged in one end adjacent end closure 216 a switch mechanism 236 comprising a sleeve member 238 of insulating material axially movable on rod 222, having an annular electrical contact ring 240 secured thereto. The sleeve 238 is spring pressed in one direction by a coil spring 242 disposed axially between the piston 220 and the sleeve 238 and in the opposite direction by annular Belleville spring 244 disposed between the sleeve and end closure 216. The contact ring 240 is adapted to have electrical transmission relation with split point contacts 246 arranged on an annular ring 248 of insulating material securely mounted between the end closure 216 and the end of cylinder 210, said contacts 246 being arranged in the electrical circuit for the solenoid.

The piston 220 is biased in one direction opposing the hydraulic fluid under pressure to be delivered to chamber 219, by spring 250 axially disposed between the piston and ring 248, said spring being of a like nature as spring 158 in mechanism 10, effective to move the piston 220 to parking position when the pump 209 is in recirculation operation and the contacts 232 and 234 are out of engagement.

Fig. 9 illustrates diagrammatically an electrical circuit for controlling the supply of current to coil 206 of solenoid mechanism 202, including switches 230 and 236, the solenoid coil 206 and a source of electrical current, such as a storage battery 252.

The operation of mechanism 200 compares with that of mechanism 12 in that the valve 201 similarly to valve 42 serves to control the pressure operation of the pump for the delivery of fluid under pressure to the pressure cylinder of the respective mechanisms, valve 42 in the case of mechanism 12 being vacuum controlled and valve 201 in mechanism 200 electrically controlled. The electrical control system for valve 201 bears similarly in principle to the vacuum control system in that valve 221 controls the operational electric circuit as to desired operation of the windshield wiper mechanism whether it be slow, medium, fast or parked. When the valve 221 is moved to a position for parking, it breaks the electrical circuit and disrupts the flow of current to the coil thereby permitting the pump pressure to move the valve 201 and causes a recirculation operation of the pump. This operation corresponds to the position of valve 102 shutting off the vacuum to cylinder 50 in mechanism 12.

Under conditions of windshield wiper operation wherein the valve 221 is rotated an amount to provide for the engagement of electrical contacts 232 and 234 permitting of the flow of electrical current through switch 230 the electrical circuit is then in readiness for the intermittent or cycling operation of switch 236 controlled as by the movement of piston 220 and piston rod 222. With the piston 220 moved to the end of its operating stroke in one direction under the influence of tension spring 250 the contact ring 240 is snapped into engagement with split contacts 246 by the action of Belleville spring 244 overcoming or exceeding the load of spring 242 interposed between sleeve 238 and piston 220. As the contact members 240 and 246 come together the transmission of electrical current through switch 236 is provided and in connection with closed switch 230 permits of the flow of current to solenoid mechanism 202 causing a movement of the armature 208 and valve 201 attached thereto. The movement of valve 201 results in closing passage 34 to connection with passage 36 thereby effecting a pressure operation of pump 209 and the consequent delivery of fluid under pressure by way of conduit 211, passage 218 and either of passages 224 or 226 in valve 221, depending on the speed regulation desired, into chamber 219 of cylinder 210. The delivery of fluid under pressure to chamber 219 acts to move piston 220 against the resistance of spring 250 and 242 such that after the predetermined movement of piston 220 a sufficient load is built up in spring 242 acting on sleeve 238 effective to exceed the load of Belleville spring 244 causing the snap action movement of sleeve 238 and the separation of the contact members 240 and 246 effective to open switch 236 and disrupt the flow of electrical current to the solenoid mechanism. As the coil 202 is deenergized the pressure of the pump 209 similarly as in a parking operation moves valve 201 and this provides recirculation operation of pump 209. At this stage the spring 250 takes over to reciprocate piston 220 in the opposite direction to the fluid pressure operation to complete a single cycle of operation, the like of which will repeat itself as long as switch 230 is held in closed position.

The valve 201 although differing slightly in structure to valve 42 primarily because of the utilization of a different actuating control means therefore operates very similarly thereto and for all general purposes one may be substituted for the other to give comparable operating conditions.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. Mechanism for operating devices with an oscillatory motion comprising means for producing hydraulic pressure, a valve for controlling the discharge therefrom, a motion transmitting element actuated by the pressure delivered thereto from the hydraulic pressure producing means, spring means biasing the motion transmitting element against the pressure producing means acting on the motion transmitting element, means for producing other than hydraulic pressure for controlling the actuation of the valve, trigger action valve means actuated by movement of the motion transmitting element for controlling the discharge of the second pressure producing means, and a manually actuated combination valve means having a part intermediate the valve controlling the discharge from the hydraulic pressure producing means and the motion transmitting element for regulating the flow of hydraulic fluid to and from the motion transmitting element and another part, intermediate the trigger valve and valve for controlling the discharge from the hydraulic pressure producing means, for controlling the discharge of the second pressure producing means.

2. Mechanism for operating devices with an oscillatory motion comprising means for producing hydraulic pressure, a power operated valve for controlling the discharge therefrom, a source of power for actuating the valve, a motion transmitting element actuated in one direction by hydraulic pressure fluid imposed thereon from the hydraulic pressure producing means, spring means for actuating the motion transmitting element in a direction opposite to the hydraulic pressure fluid, a snap action valve actuated by the motion transmitting element effective to cut off or restore at the respective predetermined opposite ends of motion of the element the source of power actuating the first mentioned valve, and a manually actuated valve means for regulating the flow of hydraulic fluid to and from the motion transmitting element and for simultaneously controlling the flow of power for actuating the valve controlling the discharge from the hydraulic pressure producing means.

3. Mechanism for operating a device requiring oscillation comprising a hydraulic fluid pressure source of power, a motion transmitting mechanism actuated by the hydraulic power means in one direction, a conduit for conveying hydraulic fluid between the hydraulic power means and motion transmitting mechanism, means for actuating the motion transmitting mechanism in the opposite direction to the hydraulic pressure fluid when the pressure is off, a power operated valve for controlling the discharge of fluid from the hydraulic power means, the communication of the discharge and intake means of the hydraulic power means and discharge from the motion transmitting element to the fluid supply for the hydraulic power means, a source of power for actuating the power operated valve, a snap action valve actuated by movement of the motion transmitting mechanism for controlling the supply of power for the first mentioned valve, and a manually actuated valve mechanism having a part operable in the conduit between the hydraulic power means and motion transmitting mechanism for regulating the flow of fluid between said means and mechanism, and a part operable in the power supply for actuating the valve controlling the discharge from the hydraulic power means, intermediate said valve and the snap action valve for controlling the power supplied to the valve controlling the discharge from the hydraulic power means.

4. Mechanism for operating a device requiring oscillatory motion comprising a hydraulic fluid pressure producing means, a motion transmitting mechanism actuated by the hydraulic pressure producing means, a conduit for conveying hydraulic fluid from the hydraulic pressure producing means to the motion transmitting mechanism, spring means for urging the motion transmitting mechanism in an opposite direction to the hydraulic fluid under pressure delivered thereto by the hydraulic fluid pressure producing means, a power operated valve for controlling the discharge from the hydraulic fluid pressure producing means and the discharge from the motion transmitting mechanism for return to the hydraulic fluid pressure producing means, a source of vacuum power for actuating the valve, a snap action valve actuated by movement of the motion transmitting element for controlling the vacuum supplied for actuation of the first mentioned valve, and a manually actuated valve for combinedly regulating the flow of hydraulic fluid in the conduit between the hydraulic pressure producing means and for controlling the vacuum supplied to the first mentioned valve, in addition to the snap action valve.

5. Mechanism for operating a member requiring oscillatory motion comprising a hydraulic pump device, a hydraulic cylinder, a conduit connecting the pump and cylinder, a power operated valve for controlling the fluid discharge from the pump and return of fluid from the cylinder to the pump reservoir, a vacuum cylinder, a piston reciprocable in the vacuum cylinder coupled to the valve, spring means urging the valve and piston in one direction, a source of vacuum supply for the cylinder effective to urge the piston and valve against the spring, a conduit connecting the vacuum cylinder and vacuum supply, a piston reciprocable in the hydraulic cylinder movable in one direction under hydraulic pressure fluid, a spring for urging and moving the piston in a direction opposite to the hydraulic pressure fluid when the pressure is removed therefrom, a snap action valve actuated by movement of the piston in the hydraulic cylinder for controlling the vacuum supplied through the vacuum conduit, and a manually actuated valve having a part movable in the hydraulic conduit intermediate the hydraulic cylinder and power operated valve, for regulating the flow of fluid therethrough and a part movable in the vacuum conduit intermediate the vacuum cylinder and snap action valve for controlling the flow therethrough in addition to the snap action valve.

6. Mechanism for operating a member requiring oscillatory motion comprising a hydraulic pump device, a hydraulic cylinder, a conduit connecting the pump and cylinder, a power operated valve for controlling the fluid discharge from the pump and return of fluid from the cylinder to the pump reservoir, a vacuum cylinder, a piston reciprocable in the vacuum cylinder coupled to the valve, spring means urging the valve and piston in one direction, a source of vacuum supply for the cylinder effective to urge the piston and valve against the spring, a conduit connecting the vacuum cylinder and vacuum supply, a piston reciprocable in the hydraulic cylinder movable in one direction under hydraulic pressure fluid, a spring for urging and moving the piston in a direction opposite to the hydraulic pressure fluid when the pressure is removed therefrom, a snap action valve actuated by movement of the piston in the hydraulic cylinder for controlling the vacuum supplied through the vacuum conduit, a relief valve incorporated in the piston reciprocable in the vacuum cylinder, and a manually actuated valve having a part movable in the hydraulic conduit, intermediate the hydraulic cylinder and power operated valve, for regulating the flow of fluid therethrough and a part movable in the vacuum conduit intermediate the vacuum cylinder and snap action valve for controlling the flow therethrough in addition to the snap action valve.

7. Mechanism for operating a member requiring oscillatory motion comprising a hydraulic pump device having interconnecting intake and discharge ports, a fluid supply communicating with the intake port and intercommunication between its discharge and its fluid supply, a hydraulic cylinder, a conduit connecting the pump and cylinder, a valve for the pump having a part for controlling the flow between the intake and discharge ports and discharge from the pump and a part for controlling the flow between the discharge port of the pump and the fluid supply, a vacuum cylinder, a piston reciprocable in the vacuum cylinder coupled to the valve, spring means urging the valve and piston in one direction, a source of vacuum supply for the cylinder effective to urge the piston and valve against the spring, a conduit connecting the vacuum cylinder and vacuum supply, a piston reciprocable in the hydraulic cylinder movable in one direction under hydraulic pressure fluid, a spring for urging and moving the piston in a direction opposite to the hydraulic pressure fluid when the pressure is removed therefrom, a snap action valve actuated by movement of the piston in the hydraulic cylinder for controlling the vacuum supplied through the vacuum conduit, and a manually actuated valve having a part movable in the hydraulic conduit intermediate the hydraulic cylinder and power operated valve, for regulating the flow of fluid therethrough and a part movable in the vacuum conduit intermediate the vacuum cylinder and snap action valve for controlling the flow therethrough in addition to the snap action valve.

8. Mechanism for operating a member requiring oscillatory motion comprising a hydraulic pump having intercommunicated intake and discharge ports and intercommunicated discharge port and fluid supply, a valve having a pair of axially spaced heads of like area and a third head of greater area spaced axially from the other heads, one of the pair of heads operable to control the communication between the intake and discharge ports and the larger head operable to control the communication between the discharge port and fluid supply, the discharge pressure from the pump acting on the larger head effective to move the valve in one direction against the resistance of the pressure fluid acting on the other heads of the valve, a hydraulic cylinder, a conduit providing communication between the cylinder and discharge port and fluid supply for the pump, a piston reciprocable in the hydraulic cylinder actuated by the fluid pressure delivered thereto in one direction, a spring for actuating the piston in a direction opposite to the fluid pressure, a vacuum cylinder having a supply connection at one axial end and an atmospheric opening at its other axial end, a vacuum producing means, a conduit providing for communication between the vacuum cylinder and vacuum producing means, a piston reciprocable in the vacuum cylinder secured to an extension of the valve for the hydraulic pump, a valve in the vacuum conduit actuated by the movement of the piston in the hydraulic cylinder for controlling the supply of vacuum delivered through the vacuum conduit, a manually actuated valve for simultaneously controlling the flow of fluid in the vacuum and hydraulic conduits and a member operated in oscillatory motion by the piston in the hydraulic cylinder.

9. Mechanism for operating a member requiring oscillatory motion comprising a hydraulic pump apparatus including a valve housing having intercommunicating intake and discharge ports for the pump, an intercommunicated outlet with the discharge port, an intercommunication of the intake port with a fluid supply for the pump and an intercommunication of the outlet with the fluid supply, a vacuum cylinder having respective vacuum and atmospheric connection openings at opposite ends thereof, a valve reciprocable in the housing having parts controlling the several intercommunications therein and a piston on one end reciprocable in the cylinder between the openings at either ends thereof, a source of vacuum for actuating the piston in one direction, a spring for actuating the piston oppositely to the vacuum, means for conveying the vacuum from the source of supply to the cylinder, a hydraulic cylinder, means for conveying the fluid from the outlet of the pump valve housing to the hydraulic cylinder, a piston reciprocable in the hydraulic cylinder under the influence of hydraulic fluid pressure in one direction, a spring for actuating the piston in the hydraulic cylinder in a direction to the hydraulic fluid pressure as impinged thereon, a member connected to the piston for operational movement therewith, a valve actuated by the piston for controlling the vacuum supplied through the vacuum conveying means to the vacuum cylinder, and a valve operable in addition to the valve in the valve housing and valve actuated by the piston in the hydraulic cylinder to simultaneously control the flow of vacuum and hydraulic fluid through the respective vacuum and hydraulic conveying means.

10. Apparatus for automotive vehicles comprising a hydraulic pump driven from the vehicle engine, a hydraulic cylinder, means for conveying hydraulic fluid between the pump and cylinder, a valve in the pump for controlling the flow of fluid between the pump and cylinder, power derived from some source connected with the vehicle engine for actuating the valve, means reciprocable in the hydraulic cylinder in one direction under the influence of pressure fluid delivered thereto, spring means for reciprocating the means in the hydraulic cylinder in a direction opposite to the pressure fluid, a valve actuated by the means reciprocable in the hydraulic cylinder for controlling the power for actuating the pump valve, a manually actuated valve for regulating the flow of fluid between the pump and hydraulic cylinder and for controlling the power for actuating the pump valve, and means connected to the piston for the oscillatory motion thereof.

11. Mechanism for operating a member requiring oscillating motion comprising a hydraulic pump, a hydraulic cylinder, means for conveying fluid between the pump and cylinder, a valve for controlling the flow of fluid between the pump and cylinder, a piston reciprocable in the cylinder, spring means for urging the piston in one direction oppositely to pressure fluid delivered thereto from the pump, a manually actuated valve for regulating the flow of fluid between the pump and cylinder, a solenoid connected to the pump valve for actuating same, an electrical switch actuated by movement of the piston, a second electrical switch actuated by movement of the valve regulating flow between the pump and hydraulic cylinder, and an electrical power supplied circuit connecting the solenoid and switches in series.

12. Mechanism for operating a member requiring oscillatory motion comprising a hydraulic pump, a hydraulic cylinder, a conduit providing communication between the pump and cylinder, a piston reciprocable in the cylinder urged in one direction by fluid under pressure delivered to the cylinder, spring means in the cylinder urging the piston in a direction opposite to the fluid delivered to the cylinder, a valve for controlling the pump for intermittent discharge therefrom of fluid under pressure and for controlling the flow of fluid from the cylinder for return to the pump fluid supply therefor, an electrical solenoid comprising a coil and armature, the armature of which is connected to the valve, a manually actuated valve for regulating the flow of fluid from the pump to the cylinder and from the cylinder to the pump's fluid supply, an electrical switch connected in series with the solenoid controlled for operation by actuation of the manual valve, an electrical snap switch in the cylinder actuated under the influence of piston movement connected in series with the solenoid and other switch and a source of electrical current for the solenoid supplied by way of the switches, said manually actuated valve being effective to modulate the rate of movement of the piston through controlling the fluid flowing therethrough and simultaneously establishing the desired on or off operation of the current supply to the solenoid, and said second switch operable in sequence to the piston operation to provide for the intermittent operation of the solenoid and pump valve actuated thereby.

13. Apparatus for internal combustion engine driven vehicles comprising a hydraulic pump driven from the engine, a hydraulic cylinder, a conduit providing communication between the pump and cylinder, a valve in the pump for controlling the flow of fluid between the pump and cylinder, a vacuum cylinder, a conduit connecting the engine vacuum source with the vacuum cylinder, a piston reciprocable in the vacuum cylinder secured at one end to the valve, a piston reciprocable in the hydraulic cylinder actuated in one direction by pressure fluid delivered thereto and in the opposite direction by spring means, a snap action valve actuated by movement of the piston in the hydraulic cylinder for controlling the vacuum supply to the vacuum cylinder, a manually actuated valve having a part intermediate the vacuum cylinder and snap action valve in the vacuum conduit for controlling the vacuum supply to the vacuum cylinder and a part in the hydraulic conduit intermediate the pump valve and the hydraulic cylinder for regulating the flow of fluid therein and means connected to the piston in the hydraulic cylinder for the operation thereof.

14. Apparatus for internal combustion engine driven vehicles comprising a hydraulic pump driven from the engine, a hydraulic cylinder, a conduit providing communication between the pump and cylinder, a valve in the pump for controlling the flow of fluid between the pump and cylinder, a vacuum cylinder, a conduit connecting the engine vacuum source with the vacuum cylinder, a piston reciprocable in the vacuum cylinder secured at one end to the valve, a piston reciprocable in the hydraulic cylinder actuated in one direction by pressure fluid delivered thereto and in the opposite direction by spring means, a snap action valve actuated by movement of the piston in the hydraulic cylinder for controlling the vacuum supply to the vacuum cylinder, a manually actuated valve having a part intermediate the vacuum cylinder and snap action valve in the vacuum conduit for controlling the vacuum supply to the vacuum cylinder and a part in the hydraulic conduit intermediate the pump valve and the hydraulic cylinder for regulating the flow of fluid therein and means movable with an oscillating motion connected to the piston in the hydraulic cylinder, said piston in the hydraulic cylinder normally movable with a reciprocating action between predetermined limits to provide for the oscillating motion of the means over a desired distance and movable beyond the normal limits of motion by the spring means urging said piston in one direction when the vacuum supply to the vacuum cylinder is cut off by the manual control valve therefor.

HOWARD J. FINDLEY.
WALTER ROSS EAMES, JR.

REFERENCES CITED

The following references are of record in the file of this patent:

UNITED STATES PATENTS

| Number | Name | Date |
|---|---|---|
| 1,943,061 | Douglas | Jan. 9, 1934 |
| 2,011,029 | Barnwell | Aug. 13, 1935 |
| 2,077,744 | Cuno | Apr. 20, 1937 |
| 2,446,611 | Rose | Aug. 10, 1948 |